United States Patent
Honda et al.

[11] Patent Number: 6,110,546
[45] Date of Patent: *Aug. 29, 2000

[54] AUTOMOBILE WEATHER STRIP AND METHOD FOR MAKING THE SAME

[75] Inventors: Hidenobu Honda; Masayoshi Ichikawa; Katsumi Nakashima, all of Ichinomiya; Hironobu Shigematsu; Hiroshi Ooyama, both of Ichihara; Takashi Sakakibara, Nagoya, all of Japan

[73] Assignees: Toyoda Gosei Co., Ltd, Aichi-ken; Sumitomo Chemical Company, Limited, Osaka-fu, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/785,533

[22] Filed: Jan. 17, 1997

[30] Foreign Application Priority Data

Jan. 19, 1996 [JP] Japan .................................. 8-007711

[51] Int. Cl.[7] .............................. B32B 27/32; B60R 13/06
[52] U.S. Cl. ......................... 428/31; 156/307.1; 428/517; 296/93
[58] Field of Search .............................. 428/31, 494, 516, 428/517, 521; 53/716.5; 296/93; 156/307.1; 264/173.16; 427/372.2

[56] References Cited

U.S. PATENT DOCUMENTS

| | | | |
|---|---|---|---|
| 4,857,230 | 8/1989 | Matsumura | 252/400 |
| 5,015,679 | 5/1991 | Matsumura | 524/99 |
| 5,157,081 | 10/1992 | Puydak et al. | 525/237 |
| 5,183,613 | 2/1993 | Edwards | 264/171 |
| 5,502,112 | 3/1996 | Peacock | 525/240 |
| 5,564,249 | 10/1996 | Borys et al. | 52/716.5 |
| 5,753,063 | 5/1998 | Sakakibara et al. | 156/219 |

FOREIGN PATENT DOCUMENTS

0443462 A2  8/1991  European Pat. Off. .

OTHER PUBLICATIONS

English Abstract of JP 6248109 (Sep. 1994).

*Primary Examiner*—Paul Thibodeau
*Assistant Examiner*—D. Lawrence Tarazano
*Attorney, Agent, or Firm*—Pillsbury Madison & Sutro Intellectual Property Group

[57] ABSTRACT

An automobile weather strip including at least (a) a weather strip body formed from a first composition including at least one rubber polymer and at least one chemical suitable for effecting sulfur-vulcanization, and (b) a decorative layer formed from a second composition including at least one thermoplastic elastomer and hydrotalcite as a discoloration-preventing agent for the decorative layer. The decorative layer is directly adhered onto the weather strip body.

3 Claims, 2 Drawing Sheets

AUTOMOBILE WEATHER STRIP AND METHOD FOR MAKING THE SAME

BACKGROUND OF THE INVENTION

1. Field of the Invention

The present invention relates to an automobile weather strip. More particularly, the present invention relates to an automobile weather strip that includes at least (a) a weather strip body formed from a rubber composition and (b) a decorative layer comprising at least one thermoplastic elastomer (TPE), the decorative layer being directly adhered onto the weather strip body.

2. Description of the Related Art

Weather strips having a decorative layer, such as a trim part, have been produced in accordance with the following techniques.

A first technique involves providing a weather strip body made of a sulfur-vulcanized rubber composition formed primarily from an ethylene-propylene-diene terpolymer (EPDM) or styrenebutadiene rubber (SBR) and covering the body with a decorative layer formed from a strip cut from a polyvinyl chloride (PVC) sheet. The PVC sheet is attached to the weather strip body via an adhesive. This first technique, however, requires several time-consuming and complicated steps, such as cutting the PVC sheet into appropriately sized and shaped strips, applying an adhesive onto the weather strip body, and adhering the strip onto the weather strip body under appropriate pressure.

In order to reduce the steps in the production of weather strips, a second technique has been proposed which involves directly extruding a decorative layer comprising a non-polar thermoplastic elastomer (TPE), such as an olefinic thermoplastic elastomer (TPO) or styrenic thermoplastic elastomer (TPS), onto a weather strip body comprising EPDM or SBR. Such extruding step should take place immediately after the vulcanization of the weather strip body. Thereafter, the decorative layer is hot-sealed directly onto the weather strip body, thereby producing a weather strip coated with the decorative layer.

However, it has been found that the weather strips as produced according to this second technique become discolored or yellowed over the passage of time. In order to prevent such discoloration, an increased amount of a pigment (colorant) can be incorporated into the decorative layer to mask the discoloration. However, this approach is not applicable to light or pale colors, since light or pale colors are not sufficiently opaque to achieve such masking effect. Therefore, in view of the recent tendency toward decorative layers colored in light or pale colors, this second technique is not practicable for a variety of light and pale colors.

A need therefore exists to provide an automobile weather strip which is both economical to produce and does not undergo discoloration, particular with regard to light or pale color decorative layers.

SUMMARY OF THE INVENTION

It is, therefore, an object of the present invention to solve the aforementioned problems associated with the related art as well as the need expressed above. In accordance with the principles of the present invention, we, the present inventors, have studied and analyzed the discoloration or "yellowing" of decorative layers in order to achieve this objective. Based on these studies and analyses, we have found that: (1) when employed alone, the non-polar TPE are not themselves discolored; and (2) the stabilizers (antioxidant, ultraviolet absorbent, etc.) used in the thermoplastic elastomer compositions are not themselves discolored.

In view of these observations, we have concluded that it is the reaction products of the sulfur vulcanizing chemicals (e.g., sulfur and vulcanizing accelerators) present in vulcanized rubber that combine with the thermoplastic elastomers to thereby cause the discoloration or yellowing.

In view of these observations, we have undertaken further investigations to identify absorbents for preventing this yellowing effect. Based on these investigations, we have found that hydrotalcite is effective as a discoloration preventing agent.

Accordingly, the above-mentioned and other objectives are obtained by providing an automobile weather strip which comprises (a) a weather strip body formed from a first composition comprising at least one rubber polymer and at least one chemical suitable for effecting sulfur-vulcanization, and (b) a decorative layer formed from a second composition comprising at least one thermoplastic elastomer and hydrotalcite as a discoloration-preventing agent for the decorative layer, the decorative layer being directly adhered onto the weather strip body.

It is a further object of the present invention to provide a process for preparing the aforementioned automobile weather strip. In accordance with the principles of the present invention, this objective is achieved by providing a method in which a sulfur-vulcanizable rubber polymer is vulcanized to form a weather strip body, and a composition for forming the decorative layer is applied to the weather strip body before the rubber polymer has completely vulcanized.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWINGS

The accompanying drawings illustrate preferred embodiments of the present invention. In such drawings.

DESCRIPTION OF PREFERRED EMBODIMENTS

Figure 1:
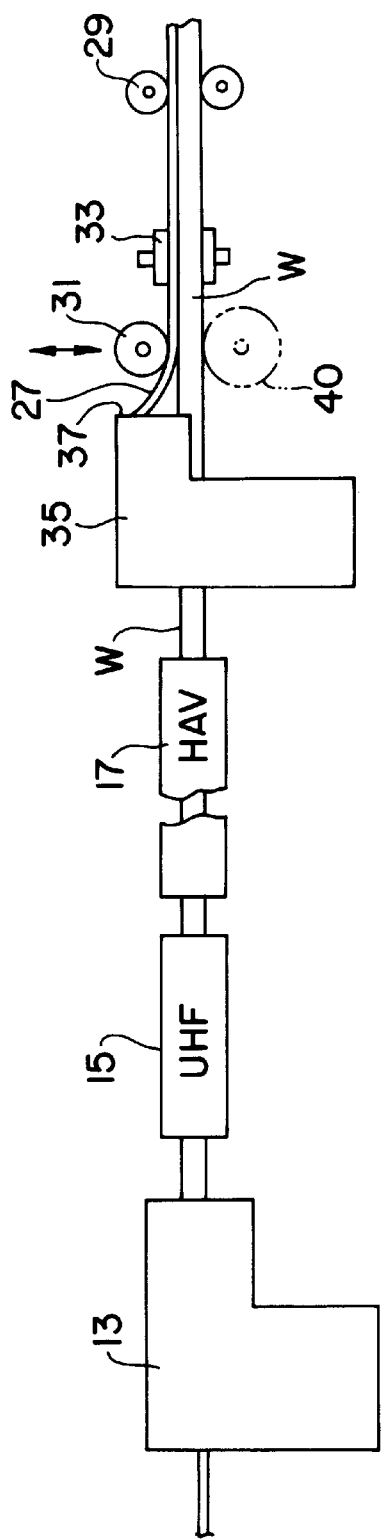
FIG. 1 is a schematic view of a method for decorating a weather strip body formed through extrusion of a vulcanized rubber composition with a decorative film layer in accordance with one embodiment of the present invention.

The present invention is now explained in further detail by the following non-limiting embodiments. Unless otherwise specifically indicated, all units referred to hereinafter are by weight.

(1) Rubber Composition:

The rubber composition that forms the weather strip body (also referred to herein as "the base layer") of the present invention comprises at least one chemical suitable for effecting sulfur vulcanization.

The chemical suitable for effecting sulfur vulcanization as referred to herein can include sulfur vulcanizing agents and vulcanizing accelerator agents. The sulfur vulcanizing agents include sulfur and activated sulfur-releasing, organic vulcanizing agents. The activated sulfur-releasing, organic vulcanizing agents include, for example and without limitation, morpholine disulfides, alkylphenol disulfides, organic polysulfide polymers, and sulfur-vulcanizing accelerators of thiuram and thiourea types. Examples of thiuram-type sulfur-vulcanizing accelerators include, by way of example and without limitation, tetramethylthiuram disulfide (TMTD), tetraethylthiuram disulfide (TETD), and dipentamethylenethiuram tetrasulfide (DPTT). Examples of thiourea-type sulfur-vulcanizing accelerators include, by way of example and without limitation, ethylene thiourea (EU) and diethylthiourea (BUR). If desired, also employable herein are chemicals for peroxide vulcanizing and chemicals for polyamine vulcanizing along with the chemicals for sulfur vulcanizing. Examples of peroxide-vulcanizing chemicals include, by way of example and without limitation, dicumyl peroxide, 2,5-dimethyl-2,5-di(tert-butylperoxy)hexane, 2,5-dimethyl-2,5-di(tert-butylperoxy) hexane-3, 1,3-bis(tert-butylperoxy isopropyl)benzene, and 1,1-bis(tert-butylperoxy)-3,3,5-trimethyl cyclohexane. Examples of polyamine-vulcanizing chemicals include, by way of example and without limitation, hexamethylenediamine, hexamethylenediamine carbamate, N,N'-dicinnamylidene-1,6-hexanediamine, and 4,4'-methylene bis(cyclohexylamine)carbamate.

The above-mentioned rubber composition further includes a rubber polymer such as, by way of example and without limitation, ethylene-α-olefin-non-conjugated diene copolymer rubbers (EODM), styrene-butadiene copolymer rubbers (SBR), and chloroprene rubbers (CR). Especially preferred for the purposes of the present invention are EODM in view of their light fastness, ozone resistance and aging resistance.

As preferred examples of α-olefins for the EODM can include, without limitation, the following: propylene, 1-butene, 1-pentene, 1-hexene, 4-methyl-1-pentene, 1-octene and 1-decene. Of these α-olefins, especially preferred is propylene. The non-conjugated dienes can include, by way of example and without limitation, 1,4-hexadiene, dicyclopentadiene, and 5-ethylidene-2-norbornene.

Preferred examples of EODM include, for example and without limitation, ethylene-propylene-ethylidene-norbornene copolymer rubbers and ethylene-propylene-dicyclopentadiene copolymer rubbers.

The rubber composition can further include additives such as, without limitation, one or more of each of the following: sulfur vulcanization agents, carbon black, process oil, lubricants, inorganic fillers, antioxidants, and any combination thereof. These additives can be mixed and kneaded to prepare a rubber material capable of being extruded to give the weather strip body of the invention.

(2) Thermoplastic Elastomer (TPE) Compositions:

The base polymer for the thermoplastic elastomer (TPE) composition employed to form the decorative layer of the present invention can be a non-polar thermoplastic elastomer such as an olefinic thermoplastic elastomer (TPO) or a styrenic thermoplastic elastomer (TPS). TPO and TPS are particularly suitable where the base layer is formed from a non-polar rubber such as EPDM or SBR. For base layers formed from polar rubbers, such as chloroprene rubbers (CR), particularly suitable base polymers for forming the decorative layer are polyvinyl chloride thermoplastic elastomers, polyester thermoplastic elastomers, and polyamide thermoplastic elastomers. Especially preferred is a combination of a base layer formed from EPDM with a decorative layer formed from TPO, in view of the light fastness and the workability thereof and the direct adhesiveness between the two.

The olefinic thermoplastic elastomer (TPO) as referred to herein comprises an olefinic resin and an ethylene-α-olefinic copolymer rubber (EOR). The ratio by weight of the olefinic resin to EOR can be, for example, in a range of from 10:90 to 90:10, and preferably in a range of from 30:70 to 80:20.

The olefinic resin suitable for the olefinic thermoplastic resin (TPO) can include, by way of example and without limitation, polypropylene (PP), polyethylene (PE), and copolymers of propylene and α-olefins having 2 or more (except 3) carbon atoms. Of these, especially preferred as the olefinic resin is polypropylene (PP).

The olefinic resin can have, for example, a melt flow rate (MFR: 2.16 kg) falling between 0.1 g/10 minutes and 100 g/10 minutes as determined by Japanese Industrial Standard (JIS) K7210. Preferably employed is a olefinic resin having a melt flow rate falling between 0.5 g/10 minutes and 50 g/10 minutes.

The α-olefins having 2 or more (except 3) carbon atoms can include, for example and without limitation, ethylene, 1-butene, 1-pentene, 3-methyl-1-butene, 1-hexene, 1-decene, 3-methyl-1-pentene, 4-methyl-1-pentene, and 1-octene.

The ethylene-α-olefinic copolymer rubber (EOR) of the olefinic thermoplastic elastomer (TPO) can be selected as, for example and without limitation, ethylene-α-olefin copolymer rubbers (EOM) and ethylene α-olefin non-conjugated-diene copolymer rubbers (EODM). As referred to herein, the term "copolymer" can include a polymer comprising two or more different monomers, and thus can be a terpolymer. Examples of the α-olefins that can be selected for the EOM and EODM rubbers can include, without limitation, the following: propylene, 1-butene, 1-pentene, 1-hexene. 4-methyl-1-pentene, 1-octene and 1-decene. Of these α-olefins, especially preferred is propylene.

The ratio by weight of ethylene to α-olefin can generally be in a range of from 90:10 to 30:70, and preferably in a range of from 85:15 to 45:55. The non-conjugated diene content of the ethylene α-olefin non-conjugated-diene copolymer rubber can be generally in a range of from 5 to 40 in terms of its iodine value.

Also employable herein is a combination of the ethylene-α-olefin copolymer rubber and the ethylene-α-olefin non-conjugated-diene copolymer rubber. Even an oil-extended rubber is employable herein.

The above-mentioned EOR may generally have a Mooney viscosity ($ML_{1+4}$:100° C.) of from 10 to 350, preferably from 30 to 300. If its Mooney viscosity is too low, the mechanical strength including abrasion resistance of the decorative layer comprising it will be often poor. However, if it is too high, the surface of the decorative layer comprising it will often be rough to worsen the outward appearance of the layer.

The ethylene-α-olefinic copolymer rubber (EOR) of the thermoplastic elastomer composition can have a non-crosslinked structure, or can be manipulated to have a partially-crosslinked structure or a wholly-crosslinked structure. The crosslinking is effected via crosslinking agents, with the crosslinking occurring, for example, while kneading the peroxide vulcanizing chemicals. The degree of crosslinking (i.e., "wholly-" or "partially-crosslinked structures") effected is dependent upon the amount of crosslinking agent added.

The styrenic thermoplastic elastomer (TPS) comprises an olefinic resin and a vinylic-aromatic compound conjugated-diene compound block copolymer or a hydrogenated derivative of the copolymer. The ratio of olefinic resin to the block polymer can be in a range of from about 10:90 to about 90:10, and preferably in a range of from about 30:70 to about 80:20.

The olefinic resin in the styrenic thermoplastic elastomer (TPS) can be the same as that in the above-mentioned olefinic thermoplastic elastomer (TPO).

The vinylic-aromatic compounds suitable for the block copolymer include, for example and without limitation, styrene, α-methylstyrene, p-methylstyrene and vinyltoluene. Of these, preferred is styrene. The conjugated-diene compounds suitable for the block copolymer can include, for example and without limitation, butadiene, isoprene, 1,3-pentadiene, and 2,3-dimethyl-1,3-butadiene. Of these, preferred are butadiene and isoprene.

The structure of the block copolymer can be a linear block copolymer represented by any of the general formulas $(A—B)_n$, $A—(B—A)_n$ and $B—(A—B)_n$ (in which formulas A represents a polymer block consisting essentially of a vinylic-aromatic compound, and B represents a polymer block consisting essentially of a conjugated-diene compound, but the boundary between the A block and the B block is not always necessary to be one in which these two blocks are distinctly differentiated from each other; and n is an integer of 1 or more), or a branched (radial) block copolymer represented by any of the general formulas $[(A—B)_n]_m—X$, $[A—(B—A)_n]_m—X$ and $[B—(A—B)_n]_m—X$ (in which A and B have the same definitions as above; X represents a branched residue; n is 1 or more; and m is an integer of 3 or more).

The average molecular weight of the block copolymer of the styrenic thermoplastic elastomer can fall generally in a range of from about 5,000 to about 500,000, and preferably in a range of from 10,000 to 300,000. If the average molecular weight of the block copolymer is less than about 5,000, the mechanical strength of the styrenic copolymer thermoplastic elastomer is low; however, if the average molecular weight is larger than about 500,000, the viscosity of the block copolymer solution at polymerization is low. Therefore, polymerization conducted at a low concentration results in the reduction in producibility. The content of the vinylic-aromatic compound in the block copolymer is preferably in a range of from 10% to 50% by weight.

The copolymer can directly be used in the present invention, but in view of its light fastness and thermal stability, a hydrogenated derivative of the copolymer is preferred.

The copolymer or its hydrogenated derivative of the thermoplastic elastomer composition can have a non-crosslinked structure, or can be manipulated to have a partially-crosslinked structure or a wholly-crosslinked structure. This may be blended with the above-mentioned EOR to be in the composition.

The thermoplastic elastomer composition can contain, if desired, conventional additives, including by way of example and without limitation, one or more of the following: inorganic fillers, such as talc and calcium carbonate; fire retardants; lubricants; antistatic agents; anti-aging agents, such as stabilizers for heat resistance and light fastness; antioxidants; pigments; and any combination thereof. Hydrotalcite which is mentioned hereinunder is added to the thermoplastic elastomer composition optionally containing such additives, then kneaded through extrusion and granulated to give a material from which is made the decorative layer of the invention via extrusion.

(3) Hydrotalcite:

In the present invention, hydrotalcite, a known natural mineral, is added to the thermoplastic composition as the discoloration preventing agent in the decorative layer. Hydrotalcite has a typical compositional formula of $Mg_6Al_2(OH)_{18}CO_3.4H_2O$, and can have a layered, two-dimensional structure, as reported for example, in the journal "Polyfile", No. 9. pp. 45–50, 1995, published by Taisei Co., the complete disclosure of which is incorporated herein by reference.

The amount of hydrotalcite to be added can be, for example, generally in a range of from 0.1 to 20 parts by weight, preferably in a range of from 0.5 to 10 parts by weight, per 100 parts by weight of the thermoplastic elastomer base polymer. If the amount of hydrotalcite added is too small, hydrotalcite do not sufficiently exhibit the discoloration preventing effect. If the amount of hydrotalcite added is too large, however, the flowability of the material to be extruded is lowered, thereby adversely affecting the outward appearance of the shaped body. Regarding the time at which hydrotalcite is added to the thermoplastic elastomer mixture, the hydrotalcite can be added during kneading of the thermoplastic elastomer composition or after kneading.

The above-mentioned thermoplastic elastomer composition can optionally contain, if desired, by way of example and without limitation, a peroxide-uncrosslinkable, hydrocarbon-type rubber substance, such as polyisobutylene or butyl rubber, and/or a mineral oil-type softener. The amount of the mineral oil-type softener, if added, can generally be in a range of from 5 to 200 parts by weight per 100 parts by weight of the thermoplastic elastomer base polymer.

The weather strip of the present invention can be produced through direct adhesion of the decorative layer onto the base layer. The direct adhesion as referred to herein indicates that no substantial barrier layer exists between the base layer and the decorative layer adhered thereonto. This direct adhesion is generally attained by extruding the thermoplastic elastomer onto a rubber base immediately after vulcanization of the rubber base to thereby make the non-cured thermoplastic elastomer directly adhered onto the rubber base under pressure. Alternatively, a thermoplastic elastomer layer may be extruded onto a rubber base just before complete vulcanization of the rubber base, thereby adhering the decorative layer to the base layer under vulcanization conditions. For example, the extrusion of the thermoplastic elastomer layer may be conducted after not less than about 90% of the total vulcanization has been effected.

Any other conventional method may also be employed herein to produce the weather strip of the present invention. A preferred method for producing the weather strip is discussed in detail below in connection with FIGS. 1–4.

Figure 2:
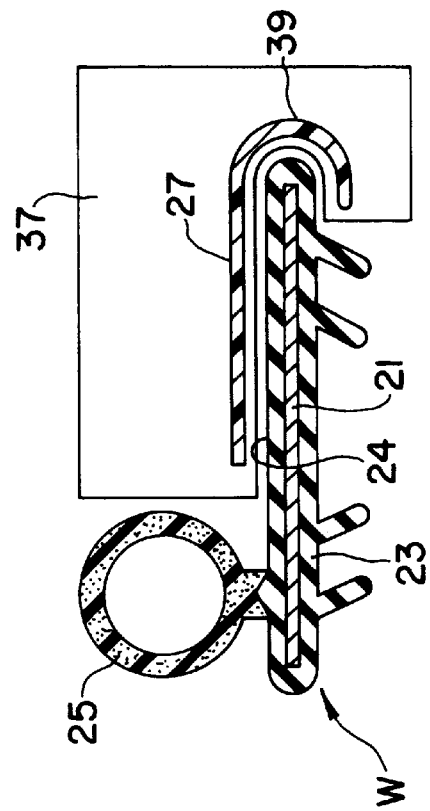
FIG. 2 is a vertical cross-sectional view showing the relationship between a film-extruding die and an extruded strip of a vulcanized rubber composition, in accordance with an embodiment of the present invention.
Figure 3:
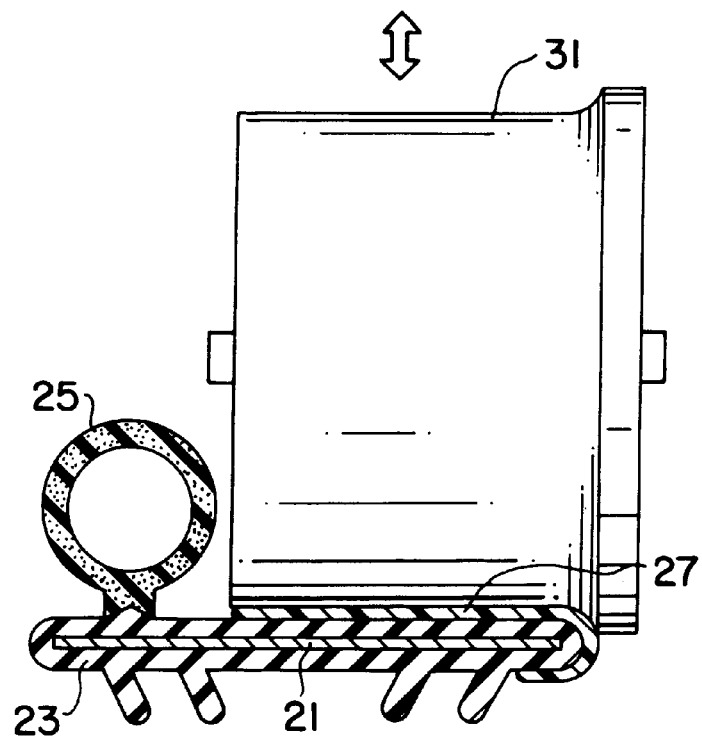
FIG. 3 is a vertical cross-sectional view showing the relationship between an upper surface-pressing roller, the decorative film and the extruded strip of vulcanized rubber composition.

A cross-head, two-color extruder 13 (FIG. 1) is employed to extrude a base strip having a cross-sectional profile as shown in FIG. 2. Next, the thus-extruded base strip is vulcanized in an ultra-high-frequency microwave vulcanizing device (UHF) 15 and a hot-air vulcanizing device (HAV) 17 to obtain a vulcanized rubber weather strip body W. This weather strip body W comprises a holding part (trimming part and decorative part) 23 of solid rubber with an inert member 21 embedded therein, and a hollow sealing part 25 of sponge rubber formed on the upper surface of the holding or trimming part 23.

Next, a decorative film 27 is formed via extrusion of a thermoplastic elastomer composition, independently of the weather strip body W, to have a predetermined thickness and a predetermined width. Before being cured, this film is adhered onto a portion of the upper surface of the holding or trimming part 23 of the weather strip body W, or that is, onto the surface 24 thereof to be decorated. The step of adhering can be performed by employing pressing rollers 31 and 33, whereby the decorative film 27 is laminated on surface 24 of the weather strip body W (see FIG. 1).

The extruding and adhering step can be performed by disposing a decorative film extruder 35 at such a position that the decorative film is extruded and applied to the weather strip body W before the vulcanization of the weather strip body W is finished. In the illustrated embodiment, this position is beyond the outlet of the hot-air vulcanizing device 17. The pressing rollers 31 and 33 are disposed in that order, adjacent the outlet of the decorative film-extruding die 37, with pressing rollers 31 and 33 applying pressure against the decorative film and onto the weather strip body W.

Figure 4:
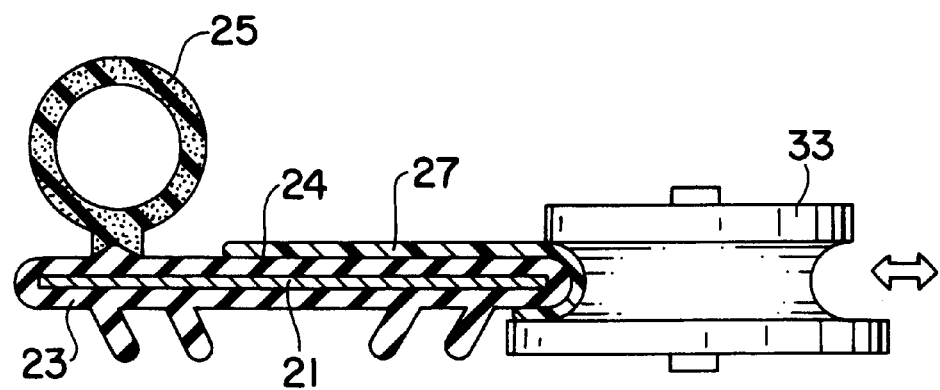
FIG. 4 is a vertical cross-sectional view showing the relationship between the side-pressing roller, the decorative film and the extruded strip of a vulcanized rubber composition.

The film-forming orifice 39 of the film extruding die 37 and the weather strip body W are positioned in the relationship as shown in FIG. 2. The upper surface-pressing roller 31, shown in FIGS. 1 and 3, and the side-pressing roller 33, shown in FIGS. 1 and 4, are positioned relative to the weather strip body W so as to be on top of and at an end of the weather strip body W, respectively. In FIG. 1, reference numeral 29 is a take-up roller. Relative to the pressing roller 31, a receiving roller 40 can be provided (see the phantomed line in FIG. 1).

In order to ensure the direct adhesion between the weather strip body W and the decorative film 27, it is desirable that the decorative film 27 is fed between the pressing rollers, 31 and 33, and the weather strip body W (extruded strip of vulcanized rubber) at a temperature not lower than the melting point of the thermoplastic resin constituting the film 27, and discharged from the rollers 31 and 33, while cooling the film 27 to a temperature lower than the melting point of the thermoplastic resin with these pressing rollers 31 and 33.

The temperature of the pressing rollers 31 and 33 is generally controlled to fall between 40° C. and 50° C. After the film 27 has been extruded at a temperature higher than the melting point of the thermoplastic resin by from 10° C. to 20° C., the decorative film 27 and the extruded strip of vulcanized rubber W are fed between the pressing rollers 31 and 33 at a temperature not lower than the melting point of the thermoplastic resin. It is desirable that the weather strip W is also heated at a temperature of from about 100 to 120° C. or so when being passed through the pressing rollers 31 and 33.

The upper surface-pressing roller 31 may be an embossed roller. Using such an embossed roller, the decorated part 24 may be given a desired pattern.

EXAMPLES

The following non-limiting examples serve to explain embodiments of the present invention in more detail.

(1) Preparation of TPE Compositions (i) Example 1

20 parts of PP (MFR at 230° C.: 12 g/10 min), 80 parts of EPDM (non-conjugated diene copolymer, ethylene-propylene-5-ethylidene-2-norbornene; ratio by weight of ethylene/propylene=79/21, iodine value=12), and 0.2 parts of an organic peroxide, 2,5-dimethyl-2,5-di(tert-butylperoxy) hexane were melt-mixed in a Banbury mixer for 12 minutes and then dynamically heat-treated. Next, 5 parts of a paraffin-type processed oil, "Diana PW380" (produced by Idemitsu Kosan Co.), 0.6 parts of a white pigment, $TiO_2$, and 1 part of hydrotalcite, "DHT-4A" (produced by Kyowa Chemical Co.) were added thereto and further mixed for 5 minutes. The resulting composition was then granulated through a single-screw extruder to obtain TPE pellets of Example 1, which are used hereinunder to form a decorative layer through extrusion.

(ii) Example 2

TPE pellets of Example 2 were prepared in the same manner as in Example 1, except that 1.2 parts of the white pigment was used.

(iii) Comparative Example 1

TPE pellets of Comparative Example 1 were prepared in the same manner as in Example 1, except that hydrotalcite was not added herein.

(2) Test Methods

A rubber base strip (having a size of 2 mm thickness×40 mm width, and having inserts embedded) was formed through extrusion of the rubber composition comprising the components mentioned below. Immediately after vulcanization of the strip, each of the TPE blends prepared above was extruded out and adhered under pressure onto the vulcanized strip to form thereon a decorative layer (having a thickness of 0.3 mm) to prepare a laminate sheet, which was then cut into test strips having a width of 70 mm.

The EPDM-containing rubber composition (unit: parts by weight) was as follows:

EPDM 100 parts
MAF Carbon 100 parts
Plasticizer 60 parts
Zinc Flower 10 parts
Stearic Acid 3 parts
Sulfur 1.5 parts
Vulcanization Accelerator 5 parts In the above rubber composition, MAF carbon represents medium abrasion furnace carbon black, zinc flower indicates a zinc oxide powder (zinc white), and the vulcanization accelerator is TETD.

Each test piece was subjected to the following discoloration tests in accordance with JIS D 0205 to determine the color difference in each test piece before and after the tests, on the basis of which the discoloration resistance of each test piece was evaluated. The test results are shown in TABLE. As is apparent from these results, the samples of Examples 1 and 2 to which hydrotalcite was added have a much greater reduced degree of discoloration than the hydrotalcite-free sample of Comparative Example 1.

(i) Light Fastness:

Each sample was subjected to a forced exposure test in accordance with JIS D 0205, using a fade meter (ultraviolet carbon arc lamptype light fastness tester: black panel temperature, 83° C.), whereupon the degrees of discoloration of the sample exposed for 200 hours and 300 hours were measured.

(ii) Weather Resistance:

Each sample was subjected to a forced exposure test in accordance with JIS D 0205, using a sunshine weatherometer (carbon arc lamptype weather resistance tester: black panel temperature, 63° C.), whereupon the degrees of discoloration of the sample exposed for 200 hours, 300 hours and 400 hours were measured. The results are reported below in the TABLE.

TABLE

| Tested Matter | Test Time | Comparative Example 1 | Example 1 | Example 2 |
| --- | --- | --- | --- | --- |
| Light Fastness | 200 hr | 7.8 | 1.0 | 1.0 |
| Test (83° C.) | 300 hr | 8.2 | 1.8 | 1.6 |
| Weather | 200 hr | 4.8 | 1.3 | 1.3 |
| Resistance | 300 hr | 6.1 | 2.3 | 2.3 |
| Test (63° C.) | 400 hr | 7.8 | 3.8 | 2.2 |

An automobile weather strip and method for making the same are disclosed in priority application 8-007711, filed in Japan on Jan. 19, 1996, the complete disclosure of which is incorporated herein by reference.

While the invention has been described in connection with what are presently considered to be the most practical and preferred embodiments, it is to be understood that the invention is not to be limited to the disclosed embodiments, but to the contrary, is intended to cover various modifications and equivalent arrangements included within the spirit and scope of the appended claims.

What is claimed is:

1. An automobile weather strip comprising:

a weather strip body formed from a first composition comprising at least one ethylene-α-olefin non-conjugated-diene copolymer rubber and at least one sulfur-vulcanization agent; and a decorative layer directly adhered onto said weather strip body, said decorative layer formed from a second composition comprising at least one olefinic thermoplastic elastomer and hydrotalcite as an agent for preventing coloration by sulfur, said hydrotalcite being present in an amount in the range of from 0.5 to 10 parts by weight per 100 parts by weight of the olefinic thermoplastic elastomer.

2. The automobile weather strip according to claim 1, wherein said olefinic thermoplastic elastomer comprises polypropylene and at least one copolymer selected from the group consisting of an ethylene-α-olefin copolymer rubber and an ethylene α-olefin non-conjugated-diene copolymer rubber, and further wherein a ratio by weight of said polypropylene to said at least one copolymer is in a range of from 10:90 to 90:10.

3. A method for making an automobile weather strip, said method comprising:

sulfur vulcanizing a sulfur-vulcanizable composition comprising at least one ethylene-α-olefin non-conjugated-diene copolymer to form a weather strip body; and extruding an extrudable composition directly onto the rubber polymer before completing said sulfur vulcanization of the sulfur-vulcanizable composition to form a decorative layer directly adhered to the weather strip body, the extrudable composition comprising at least one olefinic thermoplastic elastomer and hydrotalcite as an agent for preventing coloration by sulfur, said hydrotalcite being present in an amount in the range of from 0.5 to 10 parts by weight per 100 parts by weight of the olefinic thermoplastic elastomer.

* * * * *